United States Patent [19]

Lanza et al.

[11] Patent Number: 4,939,208
[45] Date of Patent: Jul. 3, 1990

[54] TRANSPARENT BLOCK COPOLYMERS HAVING TWO MONOVINYL-SUBSTITUTED AROMATIC BLOCKS OF DIFFERENT MOLECULAR WEIGHT

[75] Inventors: Emmanuel Lanza, Waterloo; Jean M. M. G. Naveau, Nivelles; Michel Daumerie, Ghlin, all of Belgium

[73] Assignee: Labofina, S.A., Brussels, Belgium

[21] Appl. No.: 128,360

[22] Filed: Dec. 3, 1987

[30] Foreign Application Priority Data

Dec. 4, 1986 [LU] Luxembourg ............................ 86698

[51] Int. Cl.$^5$ ...................... C08F 297/04; C08L 53/02
[52] U.S. Cl. ......................................... 525/93; 525/96; 525/98; 525/256; 525/258; 525/259; 525/271; 525/314
[58] Field of Search ............... 525/271, 250, 314, 256, 525/258, 259, 93, 96, 98

[56] References Cited

U.S. PATENT DOCUMENTS

| | | | |
|---|---|---|---|
| 3,639,517 | 12/1987 | Kitchen et al. | 525/314 |
| 4,086,298 | 4/1978 | Fahrbach et al. | 525/314 |
| 4,089,913 | 5/1978 | Miki et al. | 525/314 |
| 4,091,053 | 5/1978 | Kitchen | 525/314 |
| 4,122,134 | 10/1978 | Miki et al. | 525/314 |
| 4,167,545 | 9/1979 | Fahrbach et al. | 525/314 |
| 4,168,286 | 9/1979 | Moczygemba | 525/314 |
| 4,221,884 | 9/1980 | Bi et al. | 525/314 |
| 4,704,434 | 11/1987 | Kitchen et al. | 525/271 |

*Primary Examiner*—Wilbert J. Briggs, Sr.
*Attorney, Agent, or Firm*—Michael J. Caddell; John K. Abokhair; M. Norwood Cheairs

[57] ABSTRACT

Transparent linear resinous conjugated diene/monovinyl-substituted aromatic block copolymers of improved properties are prepared by forming a monovinyl-substituted aromatic homopolymer block referred to as $S_1$, followed by forming a conjugated diene homopolymer block, referred to as $B_1$ and linked to segments $S_1$, followed by the formation of a conjugated diene/monovinyl-substituted aromatic random copolymer block, referred to as B/S and linked to segment $B_1$, followed by the formation of a monovinyl-substituted aromatic homopolymer block, referred to as $S_2$ and linked to segment B/S thereby forming the block copolymer $S_1$-$B_1$-B/S-$S_2$ wherein the molecular weight of the $S_2$ block is significantly greater than the molecular weight of the $S_1$ block.

23 Claims, No Drawings

TRANSPARENT BLOCK COPOLYMERS HAVING TWO MONOVINYL-SUBSTITUTED AROMATIC BLOCKS OF DIFFERENT MOLECULAR WEIGHT

BACKGROUND OF THE INVENTION

The present invention relates to improved transparent conjugated diene/monovinyl-substituted aromatic block copolymers and the process of their production. In one aspect, the present invention relates to improved compositions composed of a mixture of transparent conjugated diene/monovinyl-substituted aromatic block copolymers and thermoplastic polymers such as polystyrene. In a particular aspect, the present invention relates to a process for the preparation of linear transparent conjugated diene/monovinyl-substituted aromatic block copolymers which do not contain coupling agents.

Various transparent conjugated diene/monovinyl-substituted aromatic block copolymers are known. However, these copolymers have deficiencies in certain mechanical properties and, in particular, do not have a good balance of mechanical properties when they are mixed with known thermoplastic polymers.

Resinous block copolymers having at least three branches and having a multimodal structure are described in Kitchen et al, U.S. Pat. No. 3,639,517. The copolymers prepared according to Kitchen et al, have a relatively low impact strength and a relatively low elongation, alone or when admixed with polystyrene. In addition, the optical properties and flexibility of these copolymers are not exceptionally good.

An improvement in the flexibility properties has been described in Kitchen, U.S. Pat. No. 4,091,053 but other defects have not yet been improved. The flexibility properties of the copolymers, according to Kitchen, are improved by the accurate adjustment of the different styrene additions during preparation.

Branched block copolymers having at least two branches which contain elastomeric end blocks of the $A_1$-B→$A_2(x)A_2$←B and ($A_1$-$A_2$-B→$A_3$)($A_3$←B-$A_2$) type, wherein the transition in the elastomeric block occurs gradually are described in Fahrbach et al, U.S. Pat. No. 4,086,298 and Fahrbach et al, U.S. Pat. No. 4,167,545 respectively. However, block copolymers produced according to these two patents do not have very good mechanical properties.

Transparent block copolymers of bimodal structure that have at least two elastomeric branched end groups and butadiene/styrene random copolymers are described in Bi et al, U.S. Pat. No. 4,221,884. However, the block copolymers produced according to this patent do not provide satisfactory mechanical properties either.

Linear block copolymers containing an elastomeric block of butadiene/styrene random copolymer are described in Miki et al, U.S. Pat. No. 4,089,913. However, as above, block copolymers produced according to this patent do not give good results, particularly when mixed with polystyrene.

OBJECT OF THE INVENTION

It is an object of the present invention to provide conjugated diene/monovinyl-substituted aromatic block copolymers having good mechanical properties and a process for the preparation thereof. It is a more specific object of the present invention to provide transparent linear conjugated diene/monovinyl-substituted aromatic block copolymers having improved impact strength, elongation, and flexibility and a process for the preparation thereof. It is another object of the present invention to provide linear conjugated diene/monovinyl-substituted aromatic block copolymers of improved physical properties when admixed with thermoplastic polymer and a process for the preparation thereof. It is yet a further object of the present invention to provide a process for the production of linear conjugated diene/monovinyl-substituted aromatic block copolymers without the presence of a coupling agent which have both excellent mechanical properties and excellent optical properties. It is yet an additional object of the present invention to provide linear conjugated diene/monovinyl-substituted aromatic block copolymers of good mechanical properties that are easily dispersed in thermoplastic polymers such as styrene and the process for the production thereof.

SUMMARY OF THE INVENTION

In accordance with the present invention, the applicants have discovered an improved conjugated diene/monovinyl-substituted aromatic block copolymer. This block copolymer has a monovinyl-substituted aromatic homopolymer block linked to a conjugated diene homopolymer block that is linked to a conjugated diene/monovinyl-substituted aromatic random copolymer block that is linked to a second monovinyl-substituted aromatic homopolymer block that has a molecular weight significantly greater than the first monovinyl-substituted aromatic homopolymer block.

In accordance with a specific aspect of this invention, a conjugated diene/monovinyl-substituted aromatic block copolymer is prepared by forming a monovinyl-substituted aromatic homopolymer block, referred to as $S_1$; forming a conjugated diene homopolymer block, linked to segment $S_1$ and referred to as $B_1$; forming a conjugated diene/monovinyl-substituted aromatic random copolymer block, linked to segment $B_1$ and referred to as B/S; forming a monovinyl-substituted aromatic homopolymer block, linked to segment B/S and referred to as $S_2$, having a molecular weight at least twice that of the segment $S_1$; followed by recovering an improved conjugated diene/ monovinyl-substituted aromatic block copolymer.

DETAILED DESCRIPTION OF THE INVENTION

A composition in accordance with the present invention comprises a resinous block copolymer of a conjugated diene and a monovinyl-substituted aromatic represented by the following structure: $S_1$-$B_1$-B/S-$S_2$.

Wherein $S_1$ and $S_2$ are monovinyl-substituted aromatic homopolymer blocks having molecular weights within the range of about 5,000 to 50,000 for $S_1$ and about 10,000 to 150,000 for $S_2$, B is a conjugated diene/homopolymer block having a molecular weight within the range of about 3,000 to 30,000, B/S is a conjugated diene/monovinyl-substituted aromatic random copolymer block having a molecular weight within the range of about 10,000 and 100,000, and the molecular weight of $S_2$ is significantly greater than that of $S_1$.

In accordance with a process of the present invention transparent linear block copolymers containing from about 5 to 40 percent by weight of conjugated diene units and from about 60 to 95 percent by weight of monovinyl-substituted aromatic units are prepared by anionic block polymerization in a solvent medium which entails forming;

(a) A monovinyl-substituted aromatic homopolymer block with a molecular weight between about 5,000 and 50,000, referred to as $S_1$, in the presence of sufficient organolithium catalysts to initiate polymerization;

(b) A conjugated diene homopolymer block with a molecular weight between 3,000 and 30,000, referred to as $B_1$ and linked to segment $S_1$;

(c) A conjugated diene/monovinyl-substituted aromatic random copolymer block with a molecular weight between about 10,000 and 100,000, referred to as B/S and linked to segment $B_1$;

(d) A monovinyl-substituted aromatic homopolymer block with a molecular weight between about 10,000 and 150,000, referred to as $S_2$ and linked to segment B/S, wherein the molecular weight of the $S_2$ segment is significantly greater than the molecular weight of $S_1$; and (e) Collecting the thus formed conjugated diene/-monovinyl-substituted aromatic block copolymer of improved properties referred to as $S_1$-$B_1$B/S-$S_2$.

Applicants have unexpectedly found that resinous block copolymers having a defined structure and a defined linkage sequence of conjugated diene and monovinyl-substituted aromatic blocks have excellent optical and mechanical properties.

Prior to the present invention, the use of a rubbery block consisting of either a butadiene homopolymer or a random copolymer of butadiene and styrene had been recommended. Applicants have found that for a resinous block copolymer to have good mechanical properties, not only must the rubbery block consist of both monomer components, but also that the monovinyl-substituted aromatic homopolymer blocks linked to this rubbery block must have well defined molecular weights, and must occupy well defined positions. Thus, according to the present invention, the applicants have discovered that the resinous block copolymers with the best mechanical and optical properties have the following general structure: $S_1$-$B_1$-B/S-$S_2$ in which $S_1$ and $S_2$ represent, monovinyl-substituted aromatic homopolymer blocks, $B_1$ represents a conjugated diene homopolymer block, and B/S represents a conjugated diene/-monovinyl-substituted aromatic random copolymer block. Additionally, the molecular weight of $S_2$ must be significantly greater than that of $S_1$ preferably at least twice the molecular weight of $S_1$ and most preferably three times.

The block copolymers of the present invention are characterized by having excellent optical properties and excellent mechanical properties, particularly when mixed with a thermoplastic polymer such as a vinylaromatic polymer like polystyrene.

According to a more specific description of the process of the present invention, the first stage, when segment $S_1$ is formed, entails polymerizing, by anionic initiation, a monovinyl-substituted aromatic monomer, preferably styrene, in the presence of a solvent and an organolithium initiator. The proportion by weight of solvent to monomer in the medium will depend upon the viscosity of the medium and upon the amount of heat transfer in the reactor, but is preferably between about 2:1 and 10:1, with about 5:1 being most preferred.

The amount of organolithium initiator used in the polymerization process of the present invention will depend greatly upon the molecular weight desired for the first segment $S_1$.

It is preferred that the monovinyl-substituted aromatic monomer be polymerized so as to obtain an $S_1$ homopolymer block with a weight average molecular weight between about 5,000 and 50,000, more preferably between about 10,000 and 25,000.

After the polymerization of the $S_1$ homopolymer block the sequential anionic polymerization can be continued in different ways so long as the final block copolymer has the general structure $S_1$-$B_1$-B/S-$S_2$.

According to one embodiment of the present invention for continuing the sequential anionic polymerization after the formation of the $S_1$ block, a conjugated diene monomer, preferably 1,3-butadiene, is first introduced into the reaction mixture, as to form a block with a molecular weight between 3,000 and 30,000; this segment is referred to as $B_1$ and is linked to segment $S_1$. A mixture of monovinyl-substituted aromatic monomer and conjugated diene monomer is then added in order to form a random copolymer with a molecular weight between about 10,000 and 100,000; this segment is called B/S and is linked to segment $B_1$.

The random distribution of the monomer in the B/S segment is insured by introducing an agent into the solvent present in the reaction medium. This agent is chosen from Lewis bases, such as tertiary amines and ethers including cyclic ethers aliphatic monoethers and aliphatic polyethers. Such agents include, for example, triethylamine, tripropylamine, tributylamine, N,N-dimethylaniline, quinoline, tetramethylethylenediamine, tetrahydrofuran, $C_2$ and $C_3$ dialkyl ethers, diethylene glycol dimethyl ether, diethylene glycol diethyl ether, and tetratydropyran. These agents are preferably employed in an amount, relative to the total monomer, between 0.01 and 5 parts per 100 parts of resin (phr).

The polymerization will then be completed by adding the monovinyl-substituted aromatic monomer, preferably styrene, to the reaction medium so as to form a homopolymer block called $S_2$ and linked to segment B/S. The molecular weight of this $S_2$ segment is significantly greater than that of the $S_1$ segment, preferably with a molecular weight which is at least twice, and more preferably three times that of the segment $S_1$ The molecular weight preferably falls between 10,000 and 150,000.

According to another embodiment of the present invention for continuing the sequential anionic polymerization after forming the $S_1$ block, the conjugated diene and monovinyl-substituted aromatic monomers are introduced simultaneously into the reaction medium that contains less than 0.2 phr of the random distribution agent described above. In the absence of a significant amount of agent, the conjugated diene monomer polymerizes faster than the monovinyl-substituted aromatic monomer. Thus, in this reaction medium a block homopolymer containing essentially conjugated diene is formed, referred to as $B_1$ and linked to the segment $S_1$. The molecular weight of this segment should be between about 3,000 and 30,000. The linking of $B_1$ to $S_1$ is followed by the formation of a conjugated diene/-monovinyl-substituted aromatic random block copolymer, referred to as segment B/S and linked to $B_1$. The length of the B/S segment depends upon the quantity of Lewis base present in the reaction medium. Finally, after the entire quantity of conjugated diene has been consumed, a monovinyl-substituted aromatic homopolymer block with a molecular weight between about 10,000 and 150,000 is formed. The later segment is referred to as $S_2$ and is linked to the segment B/S.

The block copolymer obtained according to the process of the present invention has a molecular weight which will generally range between about 50,000 and 250,000 and a viscosity in toluene between 3.5 and 7.5 cSt (determined at 25° C. using a 5.23% solution of the polymer in toluene). It is possible to obtain higher molecular weights, but it is generally to the detriment of the flow index properties of the copolymer at the temperatures of conversion.

The applicants have also found that the optical properties of the resins can be improved by adjusting the proportion of the conjugated diene units between the homopolymer, segment $B_1$, and the random copolymer segment B/S. This proportion can vary widely; however, for the resin to have the best optical properties it is preferred that the ratio of conjugated diene units in segment $B_1$ to segment B/S be between about 0.1:1 to 0.4:1, more preferably about 0.15:1 to 0.3:1.

Examples of the conjugated dienes which can be employed in the present invention include 1,3-butadiene, isoprene, piperylene, 2,3-dimethyl-1,3-butadiene, 3-butyl-1,3-octyldiene, 2-phenyl-1,3-butadiene and mixtures thereof. The vinylaromatic monomers which can be employed in the block copolymer of the present invention include for example styrene, alpha-methylstyrene, vinyltoluene, 4-n-propylstyrene, 4-cyclohexylstyrene, 4-decylstyrene, 2-ethyl-4-benzyl-styrene, 4-p-tolylstyrene, 4-(4-phenyl-n-butyl)styrene, vinylnaphthalene and other styrenes which are substituted on the ring. Styrene and 1,3-butadiene are the preferred monomers due to their availability and consistent good results.

It is preferred that the overall ratio by weight between the conjugated diene and the monovinyl-substituted aromatic monomers present in the block copolymer of the present invention be between about 5:95 and 40:60, more preferably between about 15:85 and 35:65. When more than 95 parts of the monovinyl-substituted aromatic monomer are employed, a decrease in impact strength and in elongation are observed, whereas if less than 60 parts of the monovinyl-substituted aromatic monomer are used, the copolymer as an elastomeric texture and a deterioration in the optical properties is observed.

The block copolymers of the present invention are generally prepared by anionic polymerization in a solvent in the presence of a catalyst. The solvent can be an aliphatic, alicyclic or aromatic hydrocarbon and the catalyst is generally an organolithium compound.

Examples of suitable solvents that can be useful in the polymerization process of the present invertion include benzene, toluene, xylene, ethylbenzene, naphthalene, isobutene, n-pentane, cyclopentane, hexane, cyclohexane, methylcyclohexane, the like and mixtures thereof. Cyclohexane, and more particularly a mixture of cyclohexane and hexane, are preferably used due to their availability and to the solubility of styrene therein when using styrene-rich polymerization systems.

Examples of suitable organolithium compounds used as catalysts in the polymerization process of the present invention include ethyllithium, propyllithium, butyllithium, amyllithium, hexyllithium, cyclohexyllithium, phenyllithium, tolyllithium, naphthyllithium, the like and their isomers, especially sec-butyllithium and tert-butyllithium.

The polymerization according to the present invention is preferably carried out at a temperature of from about −20° to 150° C. and at a pressure sufficient to maintain the monomers and the solvents in the liquid phase. The polymerization is more preferably carried out at a temperature between about 20° and 110° C. and at a pressure between about atmospheric and 5 bar.

When the polymerization is complete, a quantity of di-tert-butylhydroxytoluene (BHT), water, methanol, or isopropanol, sufficient to inactivate the living chains, is added to the reaction medium and, if required, an antioxidant is also added.

The block copolymers obtained according to the process of the present invention are completely transparent and can be mixed with other polymers and used in a variety of applications, for example, in the manufacture of thermoformed articles from extruded sheets. These polymers include, for example, resins such as crystal polystyrene, polyolefins such as polyethylene or polypropylene, styrene copolymers such as styrene-methylmethacrylate (SMMA), styrene-maleic anhydride (SMA), styrene-acrylonitrile (SAN).

Particular useful compositions, with very good mechanical properties, are obtained when the block copolymers of the present invention are mixed with polystyrene at concentrations between about 10 and 90 percent by weight, preferably from about 30 to 70 percent by weight. The impact strength and flexural modulus of these compositions are significantly improved over known materials.

The following examples are given in order to illustrate the invention, but are not intended to limit the reasonable scope thereof. All parts or percentages are by weight, unless otherwise specified.

EXAMPLE 1

The following quantities, calculated per 100 parts by weight of styrene and 1,3-butadiene monomers were introduced into a pressurized reactor.

Thus, 471 parts of a solvent mixture consisting of 85% cyclohexane and 15% n-hexane were first introduced.

Then 0.07 phr of tetrahydrofuran (THF) and 16.7 parts of the styrene monomer were introduced.

The temperature of the reaction medium was then raised to 65° C. and n-butyllithium, in the form of a 20% solution in cyclohexane, was injected so as to have 0.083 phr n-butyllithium in the reaction medium.

The block $S_1$ thus polymerized had a molecular weight of 14,000.

The block polymerization was then continued by injecting simultaneously 25 parts of 1,3-butadiene and 58.3 parts of styrene, so as to form a butadiene homopolymer block with a molecular weight of 6,800 and a random copolymer block with a molecular weight of 53,200.

The remaining styrene monomer polymerized and formed a homopolymer end block with a molecular weight of 40,000.

The living copolymer thus formed was inactivated by adding 0.3 phr of BHT.

The molecular weight of the final copolymer was 114,000.

The copolymer was recovered by removing the solvent.

The properties obtained with this copolymer, considered alone or mixed with crystal polystyrene, are given under (1) in the Table following the examples.

EXAMPLE 1A

By way of comparison, the following quantities, calculated per 100 parts by weight of styrene and 1,3-butadiene monomers, were introduced into a pressurized reactor.

Thus, 672 parts of a solvent mixture consisting of 85% cyclohexane and 15% n-hexane were first introduced.

Then 0.07 phr of THF and 56.25 parts of the styrene monomer were then introduced.

The temperature of the reaction medium was then raised to 65° C. and n-butyllithium, in the form of a 20% solution in cyclohexane, was injected so as to have 0.07 phr n-butyllithium in the reaction medium.

The block $S_1$ thus polymerized had a molecular weight of 56,000.

The block polymerization was then continued by injecting simultaneously 25 parts of 1,3-butadiene and 18.75 parts of styrene, so as to form a butadiene homopolymer block with a molecular weight of 5,500 and a random copolymer block with a molecular weight of 39,000.

The remaining styrene monomer polymerized and formed and a homopolymer end block with a molecular weight of 15,000.

The living copolymer thus formed was inactivated by adding 0.3 phr of BHT.

The molecular weight of the final copolymer was 115,500.

The copolymer was recovered by removing the solvent.

The properties obtained with this copolymer, considered alone or mixed with crystal polystyrene, are given under (1a) in the Table following the examples.

EXAMPLE 2

The following quantities, calculated per 100 parts by weight of styrene and 1,3-butadiene monomers, were introduced into a pressurized reactor.

Thus, 471 parts of a solvent mixture consisting of 85% cyclohexane and 15% n-hexane were first introduced.

Then 16.7 parts of the styrene monomer were introduced into the medium.

The temperature of the reaction medium was then raised to 65° C. and n-butyllithium, in the form of a 20% solution in cyclohexane, was injected so as to have 0.087 phr n-butyllithium in the reaction medium.

The block $S_1$ thus polymerized had a molecular weight of 16,000.

5 parts of 1,3-butadiene were then introduced into the reaction medium and the reaction was allowed to take place for a sufficiently long period of time. A butadiene homopolymer fragment with a molecular weight of 5,500 was thus formed.

Then 58.3 parts of styrene and 20 parts of 1,3-butadiene were then introduced simultaneously into the reaction medium along with 0.07 phr of THF as the random polymerization promoting agent. A random copolymer of 1,3-butadiene and styrene, with a molecular weight of 42,000 was thus formed.

After the random copolymer is formed and the 1,3-butadiene, that was present in the reaction medium, was exhausted, the remaining styrene monomer formed a styrene homopolymer having a molecular weight of 43,000.

The living copolymer thus formed was inactiviated by adding 0.3 phr of BHT.

The molecular weight of the final copolymer was 135,500.

The copolymer was recovered by removing the solvent.

The properties obtained with this copolymer, considered alone or mixed with crystal polystyrene, are given under (2) in the Table following the examples.

EXAMPLE 3

The following quantities, calculated per 100 parts by weight of styrene and 1,3-butadiene monomers, were introduced into a pressurized reactor.

Thus, 367 parts of a solvent mixture consisting of 85% cyclohexane and 15% n-hexane were first introduced.

Then 0.035 phr of THF and 12.5 parts of the styrene monomer were introduced.

The temperature of the reaction medium was then raised to 65° C. and n-butyllithium, in the form of a 20% solution in cyclohexane, was injected so as to have 0.077 phr n-butyllithium in the reaction medium.

The block $S_1$ thus polymerized had a molecular weight of 12,600.

The block polymerization was then continued by injecting simultaneously 30 parts of 1,3-butadiene and 57.5 parts of styrene, so as to form a butadiene homopolymer block with a molecular weight of 6,000 and a random copolymer block with a molecular weight of 66,900.

The remaining styrene monomer polymerized and formed a homopolymer end block with a molecular weight of 50,000.

The living copolymer thus formed was inactivated by adding 0.3 phr of BHT.

The molecular weight of the final copolymer was 130,000.

The copolymer is recovered by removing the solvent.

The properties obtained with this copolymer, considered alone or mixed with crystal polystyrene, are given under (3) in the Table following the examples.

EXAMPLE 4

The following quantities, calculated per 100 parts by weight of styrene and 1,3-butadiene monomers, were introduced into a pressurized reactor.

Thus, 471 parts of a solvent mixture consisting of 85% cyclohexane and 15% n-hexane were first introduced.

Then 0.07 phr of THF and 16.7 parts of the styrene monomer were introduced.

The temperature of the reaction medium was then raised to 65° C. and n-butyllithium, in the form of a 20% solution in cyclohexane, was injected so as to have 0.032 phr n-butyllithium in the reaction medium.

The block $S_1$ thus polymerized had a molecular weight of 35,600.

The block polymerization was then continued by injecting simultaneously 25 parts of 1,3-butadiene and 58.3 parts of styrene, so as to form a butadiene homopolymer block with a molecular weight of 11,500 and a random copolymer block with a molecular weight of 76,900.

The remaining styrene monomer polymerized and formed a homopolymer end block with a molecular weight of 89,000.

The living copolymer thus formed was inactivated by adding 0.3 phr of BHT.

The molecular weight of the final copolymer was 213,000.

The copolymer was recovered by removing the solvent.

The properties obtained with this copolymer, considered alone or mixed with crystal polystyrene, are given under (4) in the Table following the examples.

EXAMPLE 5

The following quantities, calculated per 100 parts by weight of styrene and 1,3-butadiene monomers, were introduced into a pressurized reactor.

Thus, 270 parts of a solvent mixture consisting of 85% cyclohexane and 15% n-hexane were first introduced.

Then 0.07 phr of THF and 13.5 parts of the styrene monomer were introduced.

The temperature of the reaction medium was then raised to 65° C. and n-butyllithium, in the form of a 20% solution in cyclohexane, was injected so as to have 0.066 phr n-butyllithium in the reaction medium.

The block $S_1$ thus polymerized had a molecular weight of 17,900.

The block polymerization was then continued by introducing into the reaction medium 5.25 parts of 1,3-butadiene and the reaction was allowed to take place for a sufficiently long period of time. A butadiene homopolymer fragment with a molecular weight of 7,400 was thus formed.

Then 15.75 part of styrene and 19.75 parts of 1,3-butadiene were introduced simultaneously into the reaction medium. A random copolymer of 1,3-butadiene and styrene, with a molecular weight of 50,500 was thus formed.

45.75 parts of styrene monomer were then introduced into the reaction medium. The block $S_2$ thus polymerized had a molecular weight of 65,200.

The living copolymer thus formed was inactivated by adding 0.3 phr of BHT.

The molecular weight of the final copolymer was 141,000.

The copolymer was recovered by removing the solvent.

The properties obtained with this copolymer, considered alone or mixed with crystal polystyrene are given under (5) in the Table following the comparative examples.

COMPARATIVE EXAMPLES

The results obtained with a commercial S-B-S resin and with a commercial S-B resin are also presented under S-B-S and S-B respectively, in the following Table. The commercial S-B-S resin was K-resin KR05(R) obtained from Phillips Petroleum Co., having a molecular weight of 200,000. The commercial S-B resin was Finaprene 315 (R) obtained from PetroChim having a molecular weight of 140,000.

As it can be seen from the Table following, the copolymers made according to the present invention (Examples 1,2,3,4 and 5) have improved properties as compared to control copolymers (Examples 1A, S-B-S, and S-B), particularly in elongation and impact strength, while having equal or better optical properties.

TABLE

| | Example No. | | | | | | | |
|---|---|---|---|---|---|---|---|---|
| | (1) | | (1a) | | (2) | | (3) | |
| | Pure | Blend 50/50 | Pure | Blend 50/50 | Pure | Blend 50/50 | Pure | Blend 50/50 |
| S/B (a) | 75/25 | — | 75/25 | — | 75/25 | — | 70/30 | — |
| Traction (DIN 53455) | | | | | | | | |
| Elastic limit (MPa) | 10.4 | 12 | 11.5 | 12.5 | 14.4 | 10 | 8 | 8.9 |
| Break (MPa) | 23.5 | 9.7 | 22.5 | 10.0 | 26.6 | 10.6 | 17.6 | 10.1 |
| Elongation (%) | 680 | 57 | 3.6 | 1.3 | 416 | 119 | 340 | 115 |
| Modulus (MPa) | 612 | 895 | 608 | 710 | 771 | 613 | 459 | 596 |
| Flexure (DIN 53452) | | | | | | | | |
| Max. load (MPa) | 16.7 | 42.5 | 15.0 | 41.1 | 16.8 | 37.5 | 13.6 | 37.7 |
| Modulus (MPa) | 770 | 1885 | 653 | 1380 | 820 | 1469 | 571 | 1532 |
| Impact strength (DIN 53453) | | | | | | | | |
| Charpy (kg · J/M$^2$) Notched | 65.3 | 2.42 | 3.9 | 0.8 | 65.0 | 2.38 | 57.4 | 15.0 |
| Flow on heating (ASTM D 1238) | | | | | | | | |
| MFI (190° C./5 kg) (g/10 min.) | 6.5 | 5.23 | 2.2 | 3.13 | 6.7 | 5.31 | 7.3 | 4.87 |
| Optical properties (b) (ASTM D 1003) | | | | | | | | |
| Transmittance (%) | 90 | 69.3 | 78.2 | 57.5 | 89.2 | 70.1 | 87.5 | 65 |
| "HAZE" | 10.2 | 13.5 | 17 | 29 | 6.7 | 14 | 12 | 21 |

| | Example No. | | | | Commercial S-B-S radial | | Commercial S-B resin | |
|---|---|---|---|---|---|---|---|---|
| | (4) | | (5) | | | | | |
| | Pure | Blend 50/50 | Pure | Blend 50/50 | Pure | Blend 50/50 | Pure | Blend 50/50 |
| S/B (a) | 75/25 | — | 75/25 | — | 76/24 | — | 70/30 | — |
| Traction (DIN 53455) | | | | | | | | |
| Elastic limit (MPa) | 15.5 | 17.2 | 7.9 | 8.2 | 18.6 | 21.3 | * | 27.1 |
| Break (MPa) | 19.6 | 22.1 | 16.7 | 11.9 | 28.8 | 17.2 | * | (c) |
| Elongation (%) | 241 | 98 | 112 | 104 | 229 | 25 | * | 4 |
| Modulus (MPa) | 780 | 920 | 420 | 453 | (c) | (c) | * | 1758 |
| Flexure (DIN 53452) | | | | | | | | |
| Max. load (MPa) | 18.5 | 44.5 | 22.3 | 32.6 | 23 | 41.2 | * | (c) |
| Modulus (MPa) | 860 | 1945 | 1023 | 1037 | 1075 | 1170 | * | 1985 |

TABLE-continued

| | | | | | | | | |
|---|---|---|---|---|---|---|---|---|
| Impact strength (DIN 53453) | | | | | | | | |
| Charpy (kg · J/M$^2$) Notched | N.C. | 5.2 | 61 | 20.9 | 15.6 | 1.9 | * | 2.50 |
| Flow on heating (ASTM D 1238) | | | | | | | | |
| MFI (190° C./5 kg) (g/10 min.) | 1.06 | 1.25 | 3.7 | 3.59 | 3.20 | 3.26 | (c) | 3.08 |
| Optical properties (b) (ASTM D 1003) | | | | | | | | |
| Transmittance (%) | 88.3 | 66 | 90 | 68.5 | 90.8 | 66.8 | * | 52.3 |
| "HAZE" | 11 | 16 | 8.4 | 15 | 6 | 14 | * | 34.4 |

(a) I.R. spectroscopy
(b) Test: with plaques compression-moulded at 200° C. (3.2 mm thick), at 40 kg/cm$^2$
(c) Not determined
N.C. means unbroken
*Values cannot be measured

What is claimed is:

1. A process for producing transparent linear block copolymers referred to as $S_1$-$B_1$-B/S-$S_2$ which comprises forming:
   (a) A monovinyl-substituted aromatic homopolymer block with a weight average molecular weight between about 5,000 and 50,000, referred to as $S_1$;
   (b) A conjugated diene homopolymer block with a weight average molecular weight between 3,000 and 30,000, referred to as $B_1$ and linked to segment $S_1$;
   (c) A conjugated diene/monovinyl-substituted aromatic random copolymer block with a weight average molecular weight between about 10,000 and 100,000, referred to as B/S and linked to segment $B_1$; and
   (d) A monovinyl-substituted aromatic homopolymer block with a weight average molecular weight between about 10,000 and 150,000, referred to as $S_2$ and linked to segment B/S, wherein the molecular weight of the $S_2$ segment is significantly greater than the molecular weight of $S_1$.

2. The process according to claim 1, wherein the transparent linear block copolymers contain from about 5 to about 40 percent by weight of conjugated diene units and from about 60 to about 95 percent by weight of monovinyl-substituted aromatic units.

3. The process according to claim 1, wherein the conjugated diene in the block copolymer is formed from a monomer selected from the group consisting of 1,3-butadiene, isoprene, 2,3-dimethyl-1,3-butadiene, piperylene, 3-butyl-1,3-octyldiene, 2-phenyl-1,3-butadiene and mixtures thereof and the monovinyl-substituted aromatic in the block copolymer is formed from a monomer selected from the group consisting of styrene, alpha-methylstyrene, vinyltoluene, 4-n-propylstyrene, 4-cyclo-hexylstyrene, 4-decylstyrene, 2-ethyl-4-benzylstyrene, 4-p-tolylstyrene, 4-(4-phenyl-n-butyl)styrene, vinylnaphthylene, and mixtures thereof.

4. The process according to claim 3, wherein the monovinyl-substituted aromatic monomer is styrene, and the conjugated diene is 1,3 butadiene.

5. The process according to claim 1, wherein the polymerization in step (c) is carried out in the presence of a random polymerization agent.

6. The process according to claim 5, wherein the random polymerization agent is present in the medium in the range of about 0.01 to 5 phr and is chosen from the group consisting of cyclic ethers, aliphatic monoethers, polyethers, and tertiary amines.

7. The process according to claim 6, wherein the random polymerization agent is selected from the group consisting of triethylamine, tripropylamine, tributylamine, N,N-dimethylaniline, pyridine, quinoline, tetramethylethylene-diamine, tetrahydrofuran, $C_2$ and $C_3$ dialkyl ethers, diethylene glycol dimethyl ether, diethylene glycol diethyl ether, and tetrahydropyran.

8. The process according to claim 1, wherein steps (b) and (c) are conducted by introducing simultaneously both the conjugated diene and the monovinyl-substituted aromatic monomers thereby forming the $B_1$ block followed by forming the B/S block linked to the $B_1$ block wherein the polymerization is carried out in the presence of a random polymerization agent.

9. The process according to claim 1, wherein the polymerization is carried out at a temperature between about $-20°$ C. and $150°$ C. and at a pressure sufficient to maintain the monomers and solvents in the liquid phase.

10. The process according to claim 9, wherein the polymerization is carried out at a temperature between about 20° C. and 110° C. at a pressure between about atmospheric and 5 bar.

11. A process for the production of the transparent linear block copolymers comprising introducing into a solvent medium under polymerization conditions;
   (a) a quantity of a monovinyl-substituted aromatic monomer so as to form a monovinyl-substituted aromatic homopolymer block having a weight average molecular weight between 5,000 and 50,000, referred to as $S_1$; and
   (b) a quantity of conjudated diene and vinylaromatic monomers introduced simultaneously; first forming a conjugated diene homopolymer block with a weight average molecular weight between 3,000 and 30,000, referred to as $B_1$ and linked to segment $S_1$;
   then forming a conjugated diene/monovinyl-substitute aromatic random copolymer block, referred to as B/S and linked to the segment $B_1$, this polymerization being carried out in the presence of a random polymerization agent of the Lewis-base type; then forming a monovinyl-substituted aromatic homopolymer block with a weight average molecular weight between 10,000 and 150,000, referred to as $S_2$ and linked to B/S;
   wherein the weight average molecular weight of $S_2$ is at least twice that of $S_1$ and the transparent linear block copolymers contain from about 5 to 40 percent by weight of conjugated diene units and from about 60 to 95 percent by weight of monovinyl-substituted aromatic units.

12. The process according to claim 11 herein step (a) is carried out in the presence of an organo lithium catalyst.

13. The process according to claim 11, wherein the conjugated diene in the block copolymer is formed from a monomer selected from the group consisting of 1,3-butadiene, isoprene, 2,3-dimethyl-1,3-butadiene, piperylene, 3-butyl-1,3-octyldiene, 2-phenyl-1,3-butadiene and mixtures thereof and the monovinyl-substituted aromatic in the block copolymer is formed from a monomer selected from the group consisting of styrene, alpha-methylstyrene, vinyltoluene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, vinylnaphthylene, and mixtures thereof.

14. The process according to claim 13, wherein the monovinyl-substituted aromatic monomer is styrene, and the conjugated diene is 1,3 butadiene.

15. A process for the production of transparent linear block copolymers comprising introducing into a solvent medium under polymerization conditions:
   (a) A quantity of a monovinyl-substituted aromatic monomer so as to form a monovinyl-substituted aromatic homopolymer block having a weight average molecular weight between 5,000 and 50,000, referred to as $S_1$;
   (b) An amount of a conjugated diene to form a conjugated diene homopolymer block with a weight average molecular weight between 3,000 and 30,000, referred to as $B_1$ and linked to segment $S_1$;
   (c) Introducing into the reaction medium a quantity of a conjugated diene monomer and a monovinyl-substituted aromatic monomer sufficient to form a random copolymer with a weight average molecular weight between 10,000 and a 100,000 referred to as B/S and linked to segment $B_1$; and
   (d) Introducing additional monovinyl-substituted aromatic monomer so as to form a monovinyl-substituted aromatic homopolymer with a weight average molecular weight between 10,000 and 50,000, referred to as $S_2$ and linked to B/S;
   wherein the weight average molecular weight of $S_2$ is at least twice that of $S_1$ and the transparent linear block copolymers contain about 5 to 40 percent by weight of conjugated diene units and from 60 to 95 percent by weight of monovinyl-substituted aromatic units.

16. The process according to claim 15, wherein the conjugated diene in the block copolymer is formed from a monomer selected from the group consisting of 1,3-butadiene, isoprene, 2,3-dimethyl-1,3-butadiene, piperylene, 3-butyl-1,3-octyldiene, 2-phenyl-1,3-butadiene and mixtures thereof and the monovinyl-substituted aromatic in the block copolymer is formed from a monomer selected from the group consisting of styrene, alpha-methylstyrene, vinyltoluene, 4-n-propylstyrene, 4-cyclohexylstyrene, 4-decylstyrene, 2-ethyl-4-benzylstyrene, 4-p-tolylstyrene, 4-(4-phenyl-n-butyl)styrene, vinylnaphthylene, and mixtures thereof.

17. The process according to claim 16, wherein the monovinyl-substituted aromatic monomer is styrene, and the conjugated diene is 1,3 butadiene.

18. A composition comprising a resinous block copolymer of a conjugated diene/monovinyl-substituted aromatic having the following structure:

$$S_1\text{-}B_1\text{-}B/S\text{-}S_2$$

wherein $S_1$ and $S_2$ are monovinyl-substituted aromatic homopolymer blocks having molecular weights within the range of about 5,000 to 50,000 for $S_1$ and about 10,000 to 150,000 for $S_2$ and the molecular weight of $S_2$ is significantly greater than that of $S_1$; $B_1$ is a conjugated diene homopolymer block having a molecular weight within the range of about 3,000 to 30,000; and B/S is a conjugated diene/monovinyl-substituted aromatic random copolymer block having a molecular weight within the range of about 10,000 and 100,000.

19. The composition according to claim 18 wherein the $S_2$ homopolymer block has at least twice the molecular weight of the $S_1$ homopolymer block, and the linear block copolymer contains from 60 to 95 percent by weight of monovinyl-substituted aromatic units and from 5 to 40 percent by weight of conjugated diene units.

20. The composition according to claim 19, wherein; the conjugated diene monomers used to form the conjugated diene units in the copolymer are selected from the group consisting of 1,3-butadiene, isoprene, 2,3-diemethyl-1,3-butadiene, piperylene, 3-butyl-1,3-octyldiene, 2-phenyl-1,3-butadiene, and mixtures thereof; and the monovinyl-substituted aromatic monomers used to form the monovinyl-substituted aromatic units in the co polymer are selected from the group consisting of styrene, alpha-methylstyrene, vinyltoluene, 4-n-propylstyrene, 4-cyclo-hexylstyrene, 4-decylstyrene, 2--ethyl-4-benyzlstyrene, 4-p-tolylstyrene, b 4-(4-phenyl-n-butyl)styrene, vinyl-naphthylene, and mixtures thereof.

21. The composition according to claim 20, wherein the conjugated diene is 1,3-butadiene, the monovinyl-substituted aromatic is styrene, the molecular weight of $S_2$ is at least 2 times the molecular weight of $S_1$, the ratio of conjugated diene to monovinyl-substituted aromatic is between about 20:80 to 30:70, and the overall molecular weight of the resinous block copolymer is between about 50,000 and 250,000.

22. The composition according to claim 19, wherein about 10 to 90 percent by weight of the resinous block copolymer is mixed with about 90 to 10 percent by weight of a polymer chosen from the group consisting of crystal polystyrene, polyolefins, styrene methylmethacrylate, styrene-maleic anhydride and styrene-acrylonitrile copolymers.

23. The composition according to claim 22, wherein about 30 to 70 percent by weight of the resinous block copolymer is mixed with about 70 to 30 weight percent crystal polystyrene.

* * * * *